United States Patent [19]

Muirhead et al.

[11] Patent Number: 5,497,869
[45] Date of Patent: Mar. 12, 1996

[54] ELECTROMAGNETIC CLUTCH WITH IMPROVED ENGAGEMENT

[75] Inventors: Hugh J. Muirhead; Richard L. Marker, both of Lockport, N.Y.

[73] Assignee: General Motors Corporation, Detroit, Mich.

[21] Appl. No.: 301,088

[22] Filed: Sep. 6, 1994

[51] Int. Cl.⁶ .................................................. F16D 27/00
[52] U.S. Cl. ........................................ 192/84 B; 192/84 C
[58] Field of Search ............................ 192/84 B, 84 C, 192/70.21, 70.27, 70.28

[56] References Cited

U.S. PATENT DOCUMENTS

| | | | |
|---|---|---|---|
| 2,982,385 | 5/1961 | Gamundi | 192/84 B |
| 3,384,213 | 5/1968 | Bernard et al. | 192/84 |
| 4,445,606 | 5/1984 | Van Laningham | 192/106.1 |
| 5,046,594 | 9/1991 | Kakinuma | 192/84 C |
| 5,119,915 | 6/1992 | Nelson | 192/84 C X |
| 5,238,094 | 8/1993 | Steele | 192/84 B X |
| 5,250,921 | 10/1993 | Van Laningham et al. | 335/296 |

*Primary Examiner*—Andrea L. Pitts
*Attorney, Agent, or Firm*—Patrick M. Griffin

[57] ABSTRACT

An air conditioning compressor clutch transfers torque from a spring mounted armature to a pulley not directly, but indirectly, through a free floating, thin, intermediate drive plate keyed to the shaft hub between the two. The armature is fixed to a circular spring member which, in turn, is fixed to pulley. Consequently, the armature and spring turn with the pulley, obtaining concentricity and stability from the pulley bearings. When the coil is energized, the already spinning armature is pulled in, clamping the drive plate between it and the pulley. The drive plate is light enough that it accelerates quickly, and slips very little before complete engagement is made. The lightness of the drive plate also means that it is much less subject to whirl or eccentricity as it spins.

3 Claims, 3 Drawing Sheets

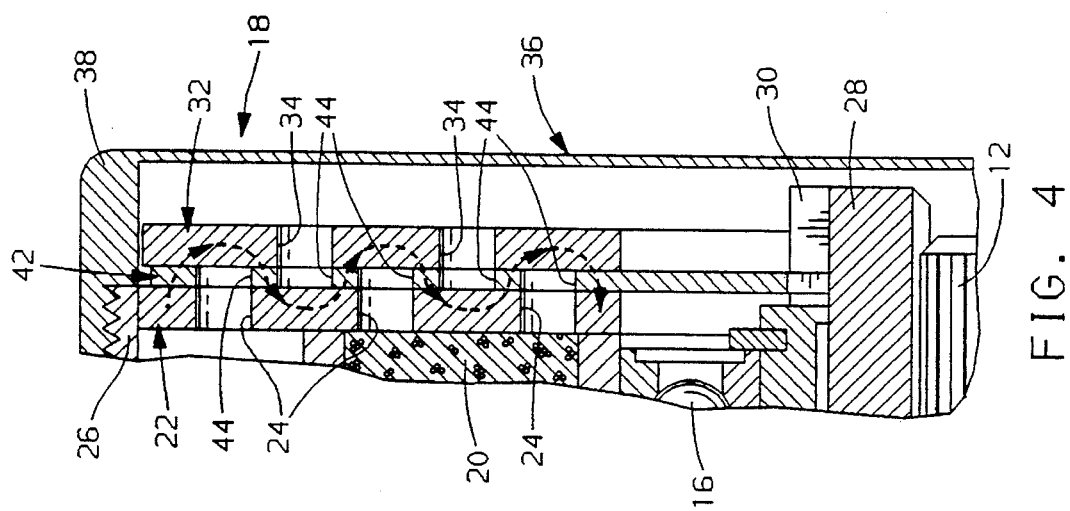
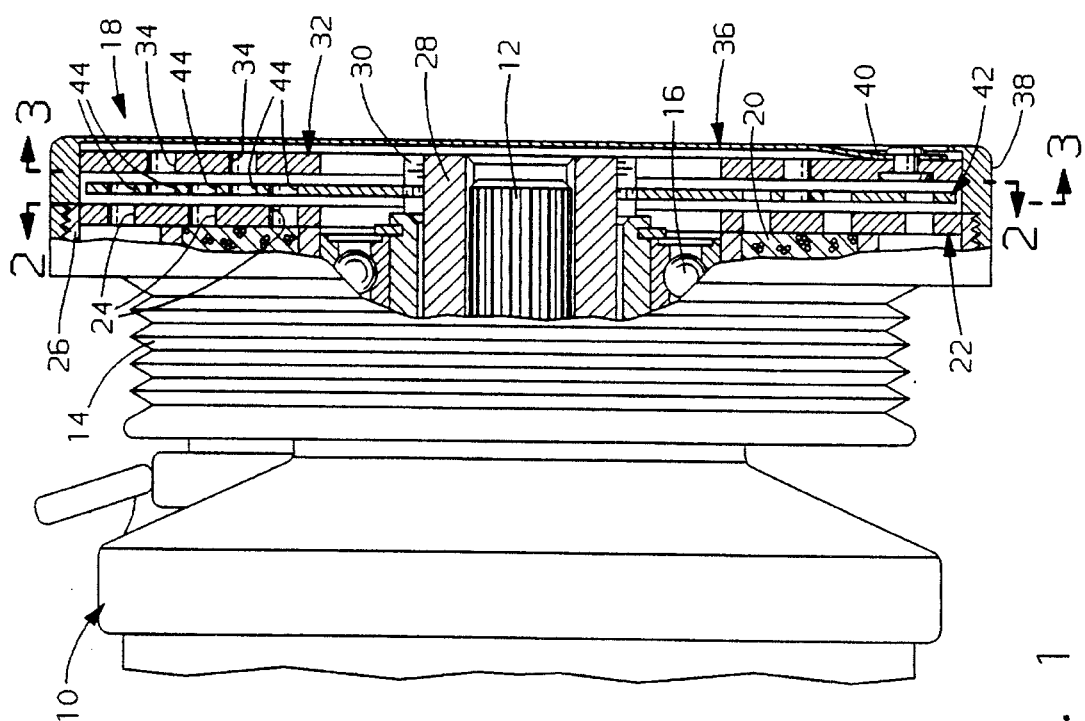

ELECTROMAGNETIC CLUTCH WITH IMPROVED ENGAGEMENT

This invention relates to electromagnetic clutches for use with vehicle air conditioning compressors in general, and specifically to such a clutch in which the driving engagement between the movable members of the clutch is improved in terms of speed, strength, feel, wear and high speed stability.

BACKGROUND OF THE INVENTION

Electromagnetic clutches used with fluid pumping devices such as automotive air conditioning system connect and disconnect engine power to the compressor based on pumping demand. Such clutches have several common elements, despite the myriad designs reflected in the published patents. A central hub is fixed to the end of a central drive shaft that extends out of the compressor. A rotor, typically an engine belt powered pulley, runs freely on solid compressor housing bearings, concentrically surrounding, and perpendicular to, the shaft. A thick iron friction disk is fixed to the pulley and rotates with it. A spring member fixed securely to the hub supports an equally heavy and thick iron armature parallel to the friction disk, and spaced therefrom. A coil located just behind the rotor, when activated, generates a magnetic field that pulls the armature into abutment with the friction disk, thereby transferring torque from the rotor to hub and shaft, through the armature and spring member. When the coil is deactivated, the spring member pulls the two back apart. The thick and heavy nature of the armature serves several purposes. Most fundamentally, it provides sufficient area (a function of its thickness) to carry sufficient flux to in turn experience a magnetic attractive force strong enough to clamp it to the friction disk. Secondarily, its thickness allows for wear over the life of the clutch. However, that wear results from a fundamental drawback of the basic design. Since the armature is thick and massive, it has a high inertia, and all of its originally stationary mass must be "spun up" to match the rapidly rotating pulley and friction disk. This does not occur instantly, because of the inertia of the armature, and because of the limited surface area in frictional contact. Wear occurs in the interim, as well as noise and a noticeable "bump" feel at engagement. Once the armature has fully engaged it is subject to instability at high speed due to radial eccentricity or whirl about the central axis. This is because the armature is held concentrically to the shaft only by the spring member, which in many cases has a torque cushion built into it that makes it radially elastic. The armature does not receive nearly the degree of concentric support that the pulley and friction disk receive from the solidly mounted compressor housing bearings.

The numerous patents granted to compressor clutches typically deal with different designs for the armature return spring members, including torque cushions, and noise dampers. Others cover different coil designs. The friction disk and armature are generally very similar in all designs, given the common requirements of magnetic force and wear, and the armature appears almost universally to be fixed to the shaft and hub through a spring member of varying design. Therefore, the industry has not yet achieved a design that is totally satisfactory.

SUMMARY OF THE INVENTION

The invention provides an electromagnetic clutch that significantly improves operation in terms of engagement speed, feel, and wear, as well as improving high speed stability.

The friction disk is similar to current designs, being a thick iron disk fixed to the pulley, which in turn is supported on the compressor, concentrically to the central drive shaft, by ball bearings. The armature, too, is a thick iron disk typical of conventional designs, very similar to the friction disk. It is mounted very differently, however. The armature, rather than being fixed by a return spring member to the end of the shaft hub, is supported completely independently of the shaft and hub. The armature is fixed to a circular spring member which has a cylindrical outer shoulder that is solidly secured to and concentric with the pulley. When the spring is unstressed, it holds the armature parallel to the friction disk, and axially spaced from it. However, the armature and spring now turn one to one with the pulley, at all times, and receive both axial and concentric, radial support from the pulley's bearings.

Engagement between the armature and friction disk is still initiated by magnetic force from the coil field, but engagement is indirect, rather than direct. A thin iron drive plate is interposed between the two, presenting a side surface parallel to and spaced from each. The drive plate is keyed to the hub with splines so that it can slide axially on, but not turn relative to, the hub. When the coil is activated, the drive plate is clamped between the already spinning armature and friction disk. Only the drive plate need be accelerated to match the armature, and this occurs quickly, because it is thin and much lighter. Consequently, there is much less initial slippage and wear, and engagement feel and noise are substantially improved. Once up to speed, the lighter drive plate is subject to far less centrifugal force and instability. The armature, engaged or disengaged, is stably supported by the pulley bearings.

When the coil is deactivated, the armature is pulled back away by the spring, but continues to turn with the pulley. The thin drive plate seeks a stable position between the armature and friction disk, bumping on either only lightly and intermittently. Or, the drive plate can be given its own resilient return device to prevent free running engagement.

DESCRIPTION OF THE PREFERRED EMBODIMENT

These and other features of the invention will appear from the following written description, and from the accompanying drawings, in which:

FIG. 1 is a cross section of a preferred embodiment of the electromagnetic clutch of the invention, showing the rotor, compressor housing and shaft in elevation in a disengaged state;

FIG. 4 is a larger view of a potion of FIG. 1, but showing the clutch engaged.

Referring first to FIG. 1, the invention is used with a conventional vehicle air conditioning compressor 10, which has a central drive shaft 12 and a rotor in the form of pulley 14 supported on bearings 16 for free rotation about shaft 12. Pulley 14 is powered by a non-illustrated engine drive belt, and so turns at high speed essentially the entire time that the engine is running. Pulley 14 runs with good axial and radial stability on the bearings 16, independently of shaft 12. Since air conditioning demand does not correspond to engine speed, pulley 14 drives shaft 12 only when the electromagnetic clutch of the invention, indicated generally at 18, is activated.

Figure 2:
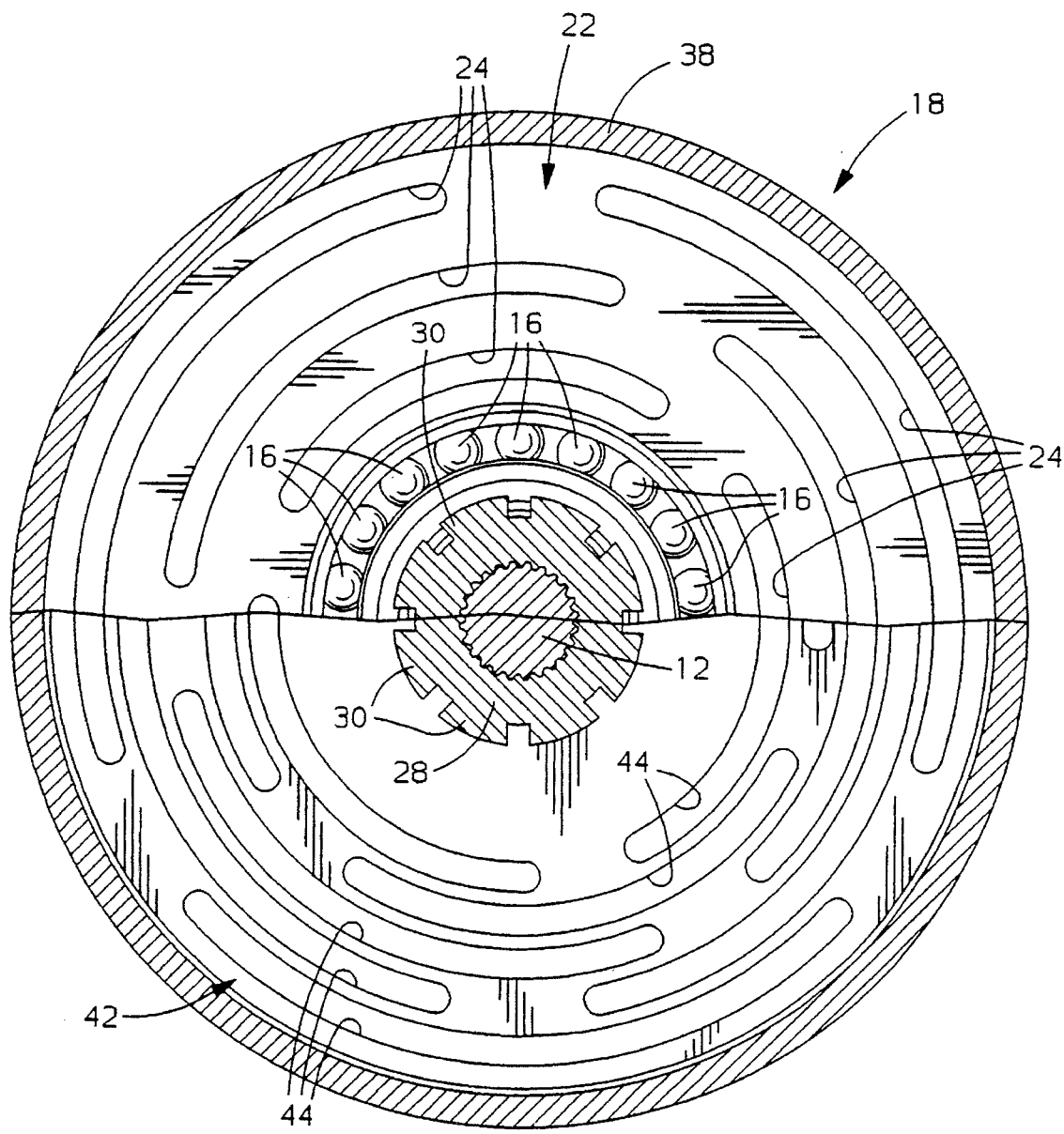
FIG. 2 is a stepped cross section taken along the line 2—2 of FIG. 1, revealing half of the drive plate and half of the friction disk.
Figure 3:
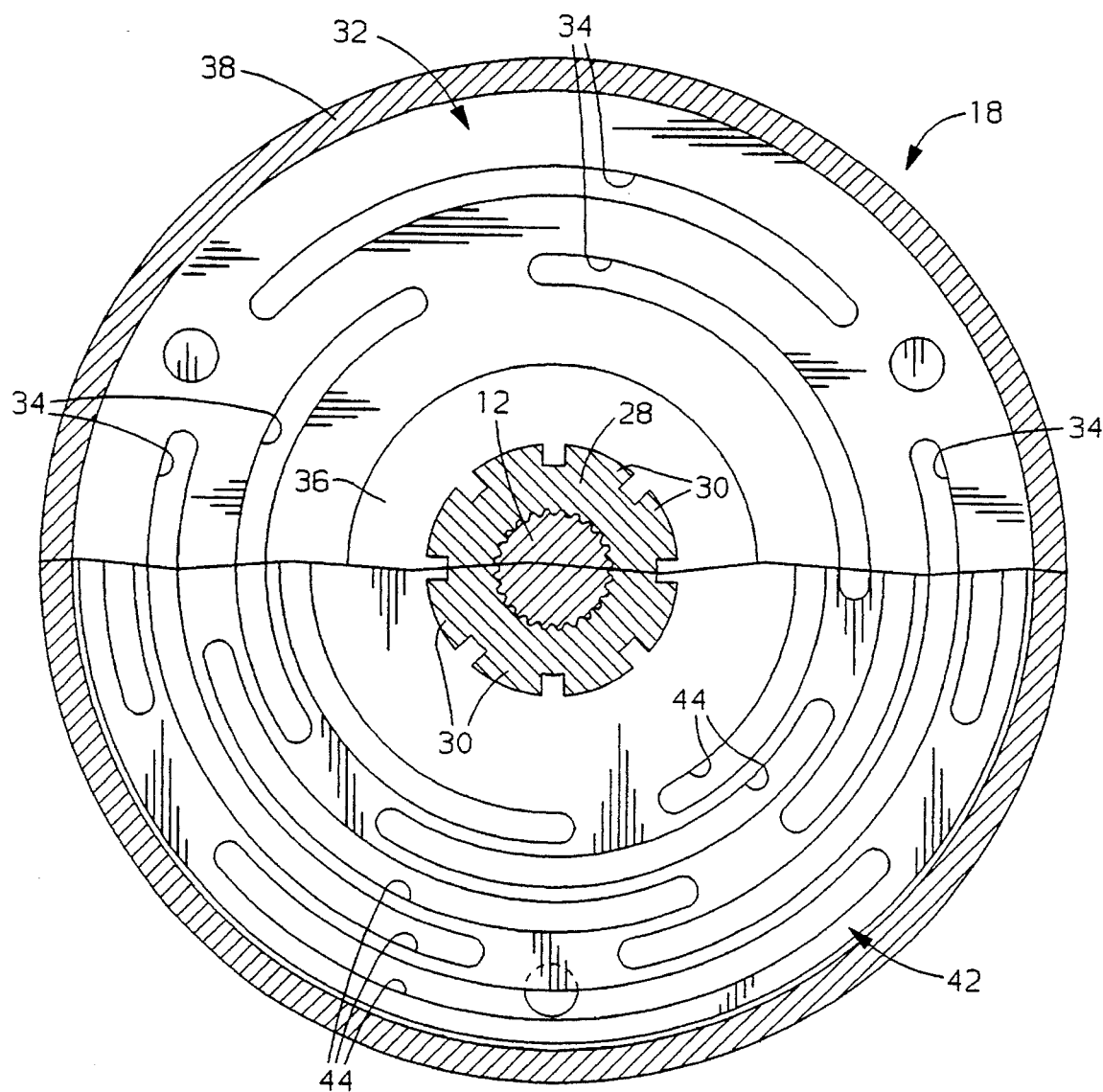
FIG. 3 is a stepped cross section taken along the line 3—3 of FIG. 1, revealing half of the drive plate and half of the armature.

Referring next to FIGS. 1 and 3, clutch 18 contains several elements that are common to other clutches. An electromagnetic coil 20, known as a solenoid or field assembly, is located behind pulley 14 and is activated by a standard control system to generate a magnetic field that extends forwardly of the pulley 14. An iron friction disk, indicated generally at 22 is solidly fixed to pulley 14, concentric thereto, with an inner surface that lies in a plane perpendicular to shaft 12. Friction disk 22 has a surface area that generally matches pulley 14, whatever that may be in a given design application, but its axial thickness will be fairly standard at around 0.15 to 0.17 inches. The dimension of disk 22 that determines its ability to carry a magnetic field is its axial thickness. Given the good permeability of iron, the thickness noted for disk 22 is sufficient to carry a strong magnetic flux field. As is also typical, friction disk 22 contains a series of three rows of evenly radially spaced, semi-circular slots 24, which help determine the magnetic circuit. A novel feature of pulley 14 is a threaded outer rim 26, an area that is usually smooth and serves no structural function. A central hub 28 is fixed to the end of shaft 12, similar in location and general size to the hub found in many clutches. However, it has no threaded apertures, since nothing is fixed immovably to it. Instead, it has a series of short, regularly spaced axial splines 30 on its outer surface, best seen in FIG. 3, which serve a purpose described below.

Referring next to FIGS. 1 and 3, clutch 18 also includes an armature, indicated generally at 32, which is an iron disk similar in size and thickness to friction disk 22. As such, armature 32 is thick enough to be able to carry enough magnetic "current" to be capable of being pulled into friction disk 22 strongly enough to make non-slipping contact therewith. That contact is not direct, however, as is described further below. Armature 32 has two rows of slots 34 similar in shape to slots 24, but staggered relative thereto, so that, when disk 22 and armature 32 are concentric, slot area in one radially overlaps with solid area in the other. This, too, is conventional, and related to directing the magnetic circuit. What is very different, however, is the manner in which armature 32 is structurally incorporated into clutch 18, completely structurally independent of hub 28 and shaft 12. It is fixed to the inside of a spring member, indicated generally at 36, which has a complete, planar center section of resilient material, or of a material thin enough to be effectively resilient. A thicker rigid, cylindrical outer shoulder 38 is threaded solidly to pulley rim 26. Specifically, armature 32 is riveted to three or four evenly spaced spring fingers 40 that are lanced out of spring member 36, giving its outer edge a very slight radial clearance from the inner surface of shoulder 38. The attachment of shoulder 38 to pulley rim 26 accurately locates armature 32 axially spaced from friction disk 22 by about 0.12", and also gives an accurate, concentric alignment to shaft 12. No part of spring member 36 rubs on or directly touches hub 28. Furthermore, the lanced spring fingers 40 can be covered so that spring member 36 and its shoulder 38 conveniently provide a sealed cover for the entire clutch 18.

Referring next to FIG. 1, the final component of clutch 18 is a drive plate, indicated generally at 42. Drive plate 42 is also iron, like armature 32, but is far thinner, at about 0.060 inches. As such, it is too thin to carry a significant magnetic field itself, but is still permeable to such a field. More significant, it is also far lighter. The inner diameter of drive plate 42 is keyed to the hub splines 30, perpendicular to the shaft 12, and can therefore slide axially, but not turn. The body of drive plate 42 is relieved by a series of five rows of evenly spaced slots 44, similar to those in armature 32 and disk 22. The drive plate slots 44 are closer together, and alignable relative to the others so that three of the five rows register radially with the three rows of slots 24 and the other two of the five register with the two rows of slots 34, for a purpose described below. Whenever clutch 18 is deactivated, as shown in FIG. 1, shaft 12, hub 28 and drive plate 42 are stationary. If the engine is also running while clutch 18 is off, so that pulley 12 is spinning freely on its bearings 16, then spring member 36 and armature 32 are rotating rapidly with it. However, armature 32 spins in a stable fashion, since the shoulder 38, being solidly tied to pulley 14 and closely surrounding armature 32, keeps it concentric. The angular momentum of armature 32 is not great compared to pulley 14 as a whole, and the bearings 16 are more than adequate to handle it. Because drive plate 42 is thinner than the FIG. 1 space between armature 32 and disk 22, it can sit between and spaced from each, freely floating, with no contact. If it bumps on either armature 32 or disk 22, it will quickly self center, given its light weight and axially slidable mounting on hub 28.

Referring next to FIGS. 4 and 1, the activation of clutch 18 is illustrated. When coil 20 is energized, a strong magnetic flux field or circuit is established, as shown by the sinuous dotted line, through both the thick armature 32 and disk 22. This creates a magnetic attractive force strong enough to pull the two together, stressing the spring fingers 40, and clamping the drive plate 42 between, as shown in FIG. 4. The radial registration of the three sets of slots 24, 34 and 44, described above, allows for a continuous magnetic circuit through the three abutted members without "short circuits" or other interruption. Because the disk 22 and armature 32 are already "up to speed," and the same speed, only the much lighter drive plate 42 need be accelerated in order to establish a solid, non-rubbing interconnection among the three. There is therefore much less initial slippage before that connection is established. Thin as it is, drive plate 42 is more than torsionally stiff enough to transfer torque to the splined hub 28, especially when it is clamped strongly between the armature 32 and disk 22. As it spins, the lighter drive plate 42 is subject to much less whirl and instability than an equivalent conventional armature would be. De-energizing coil 20 releases armature 32 to be pulled back to its free state of FIG. 1 by the spring fingers 40, and drive plate 42 re-centers itself.

Variations in the disclosed embodiment could be made. Any resilient spring member that was fixed to pulley 14, even spring fingers separately riveted to the outside of pulley 14, would still decouple the tasks of carrying the armature 32 and establishing the driving connection between the armature and the shaft 12. Such an arrangement would still provide the benefit of having the pulley bearings 16 align and carry the armature 32. The particular spring member 36 shown is especially advantageous, however, because the shoulder 38 is easily threaded on, it solidly abuts the pulley rim 26 to axially locate the armature 32, and also surrounds and radially contains the armature 32. Moreover, the circumferentially complete shoulder 38, in combination with the closed, planar center section, provides a complete noise cover and dust seal for clutch 18, as noted above. Other mechanical interconnections, such as pins and slots, could provide for a non-turning but axially sliding interface between drive plate 42 and hub 28. If desired, drive plate 42 could have its own light spring to center it when deactivated, rather than being free floating. Because drive plate 42 is so thin and light weight, and inherently free from whirl and instability, it would be particularly feasible to provide a soft torque cushion between it and the shaft 12, if desired, without adding instability. Therefore, it will be understood that it is not intended to limit the invention to just the embodiment disclosed.

The embodiments of the invention in which an exclusive property or privilege is claimed are defined as follows:

1. An electromagnetic clutch in combination with a fluid pumping apparatus of the type having a central drive shaft, a powered rotor supported for free rotation about said central drive shaft, and a selectively activated electromagnetic field generator located proximate to said rotor, said clutch comprising, an annular friction disk fixed to said rotor so as to rotate therewith and establishing a planar surface perpendicular to said central drive shaft, a central hub secured to said central drive shaft, a resilient spring member having an outer edge fixed to said rotor concentrically with said friction disk and structurally clear of said hub so as to rotate with said rotor without contacting said hub, an annular armature of magnetic material supported on said spring member so as to be axially spaced from and parallel to said friction disk when said field generator is deactivated and said spring member is in an unstressed condition, said armature having sufficient axial thickness so as to carry sufficient flux from the field produced by said activated field generator to in turn generate sufficient magnetic force to be pulled axially toward said friction disk, thereby stressing said spring member, a planar, annular drive plate located intermediate and parallel to said friction disk and armature so as to present a flat surface axially spaced from each when said field generator is deactivated, said drive plate being keyed to said hub so as to be axially slidable but circumferentially fixed thereon, said drive plate also being just sufficiently thick to transfer torque to said central hub and central drive shaft, whereby, when said field generator is activated and said armature is pulled toward said friction disk, said intermediate drive plate is clamped between an already rotating armature and friction disk and torque is transferred to said central drive shaft through said intermediate drive plate.

2. An electromagnetic clutch in combination with a fluid pumping apparatus of the type having a central drive shaft, a powered rotor supported for free rotation about said central drive shaft, and a selectively activated electromagnetic field generator located proximate to said rotor, said clutch comprising, an annular friction disk fixed to said rotor so as to rotate therewith and establishing a planar surface perpendicular to said central drive shaft, a central hub secured to said central drive shaft, a generally circular spring member having a resilient central section and a rigid, cylindrical outer shoulder secured to said rotor concentrically with said friction disk and structurally clear of said hub so as to rotate with said rotor without contacting said hub, an annular armature of magnetic material supported on said spring member central section with an outer edge radially proximate to said shoulder so as to be axially spaced from and parallel to said friction disk when said field generator is deactivated and said spring member is in an unstressed condition, said armature having sufficient axial thickness so as to carry sufficient flux from the field produced by said activated field generator to in turn generate sufficient magnetic force to be pulled axially toward said friction disk, thereby stressing said spring member, a planar, annular drive plate located intermediate and parallel to said friction disk and armature so as to present a flat surface axially spaced from each when said field generator is deactivated, said drive plate being keyed to said hub so as to be axially slidable but circumferentially fixed thereon, said drive plate also being just sufficiently thick so as to transfer torque to said central hub and central drive shaft, whereby, when said field generator is activated and said armature is pulled toward said friction disk, intermediate drive plate is clamped between an already rotating armature and friction disk and torque is transferred to said central drive shaft through said intermediate drive plate while said armature is radially confined and maintained concentric by said shoulder.

3. An electromagnetic clutch in combination with a fluid pumping apparatus of the type having a central drive shaft, a powered rotor supported for free rotation about said central drive shaft, and a selectively activated electromagnetic field generator located proximate to said rotor, said clutch comprising, an annular friction disk of magnetic material fixed to said rotor so as to rotate therewith and establishing a planar surface perpendicular to said central drive shaft, said friction disk having a series of radially spaced slots therethrough, a central hub secured to said central drive shaft, a resilient spring member having an outer edge fixed to said rotor concentrically with said friction disk and structurally clear of said hub so as to rotate with said rotor without contacting said hub, an annular armature of magnetic material supported on said spring member so as to be axially spaced from and parallel to said friction disk when said field generator is deactivated and said spring member is in an unstressed condition, said armature having sufficient axial thickness so as to carry sufficient flux from the field produced by said activated field generator to in turn generate sufficient magnetic force to be pulled axially toward said friction disk, thereby stressing said spring member, said armature having a series of radially spaced slots therethrough staggered relative to said friction disk slots, a planar, annular drive plate of magnetic material located intermediate and parallel to said friction disk and armature so as to present a flat surface axially spaced from each when said field generator is deactivated, said drive plate being keyed to said hub so as to be axially slidable but circumferentially fixed thereon, said drive plate also being just sufficiently thick so as to transfer torque to said central hub and central drive shaft, said drive plate having a series of radially spaced slots therethrough radially registerable with the slots in both said armature and friction disk, whereby, when said field generator is activated and said armature is pulled toward said friction disk, said intermediate drive plate is clamped between an already rotating armature and friction disk, a magnetic circuit is established through said friction disk, drive plate and armature by virtue of said radially registered slots, and torque is transferred to said central drive shaft through said intermediate drive plate.

* * * * *